Jan. 17, 1961      W. A. KINKAID      2,968,363

DISPENSING MERCHANDISE BY INDIVIDUAL SELF SERVICE

Filed Jan. 29, 1958      3 Sheets-Sheet 1

INVENTOR.
WALTER A. KINKAID
BY
George A. Schwenzer
ATTORNEY

INVENTOR.
WALTER A. KINKAID
BY George A. Schwenzer
ATTORNEY

Jan. 17, 1961  W. A. KINKAID  2,968,363
DISPENSING MERCHANDISE BY INDIVIDUAL SELF SERVICE
Filed Jan. 29, 1958  3 Sheets-Sheet 3

INVENTOR.
WALTER A. KINKAID
BY George A. Schwenger
ATTORNEY

United States Patent Office 2,968,363
Patented Jan. 17, 1961

---

2,968,363

DISPENSING MERCHANDISE BY INDIVIDUAL SELF SERVICE

Walter A. Kinkaid, 884 Old Orchard Road, Cincinnati, Ohio

Filed Jan. 29, 1958, Ser. No. 711,922

3 Claims. (Cl. 186—1)

This invention relates primarily to the cafeteria method of feeding a large number of persons in the shortest possible time.

My method enables many persons to individually and simultaneously serve themselves while other persons also serve themselves from an assortment of food on display without moving from a fixed or stationary position. It eliminates delay and interference caused by hesitant and undecided customers and permits the selection and serving of one or many items and departing to eating tables without interference or delay caused by other customers.

My method overcomes the difficulties now encountered in the in-line type of customers and various types of belt or train serving method. It allows customers to remain in one position to serve themselves quickly and depart for an eating place regardless of how long other persons require to serve themselves. It permits the selection of one or many items without stopping the movement of the food or merchandise on display and at the same time permits the coming and going of each customer independent of other customers to the serving counter and thence to an eating area.

The eating of food at the serving counter is eliminated and many more customers can be served from each and every place about my counter.

My method permits the displaying and serving ready dished foods either heated or refrigerated, as the case may be, without the usual sneeze guard required in many localities.

The present in-line serving counters necessitates that diners get in line upon entering a restaurant and pass through the entire line to select and take one or more of the items on display. The speed of passage of a customer through the line to a checker or pay station at the end of the line is regulated by the time consumed by a preceding customer while selecting and taking items. A serious delaying factor is introduced by customers slow to determine and take the items they desire. These indecisive customers also retard the ready dishing of food and add considerably to the time delaying factor. Other customers cannot move forward because custom and courtesy and wide gaps are formed in the line resulting in back up of the line and the attendant fictitious long line and over crowding of the restaurant.

Previous devices required customers to be seated about the serving counter and eat the selected food in that place. This is highly impractical because sanitation and the public require clean eating tables. This method is time consuming and limits the number of customers who can be served from any one place on the serving line.

To assist in the description and comprehension of my method I have illustrated in the drawings a simple mechanical construction for carrying out my method, it being evident that other means will readily occur to those skilled in the art.

Figure 1:
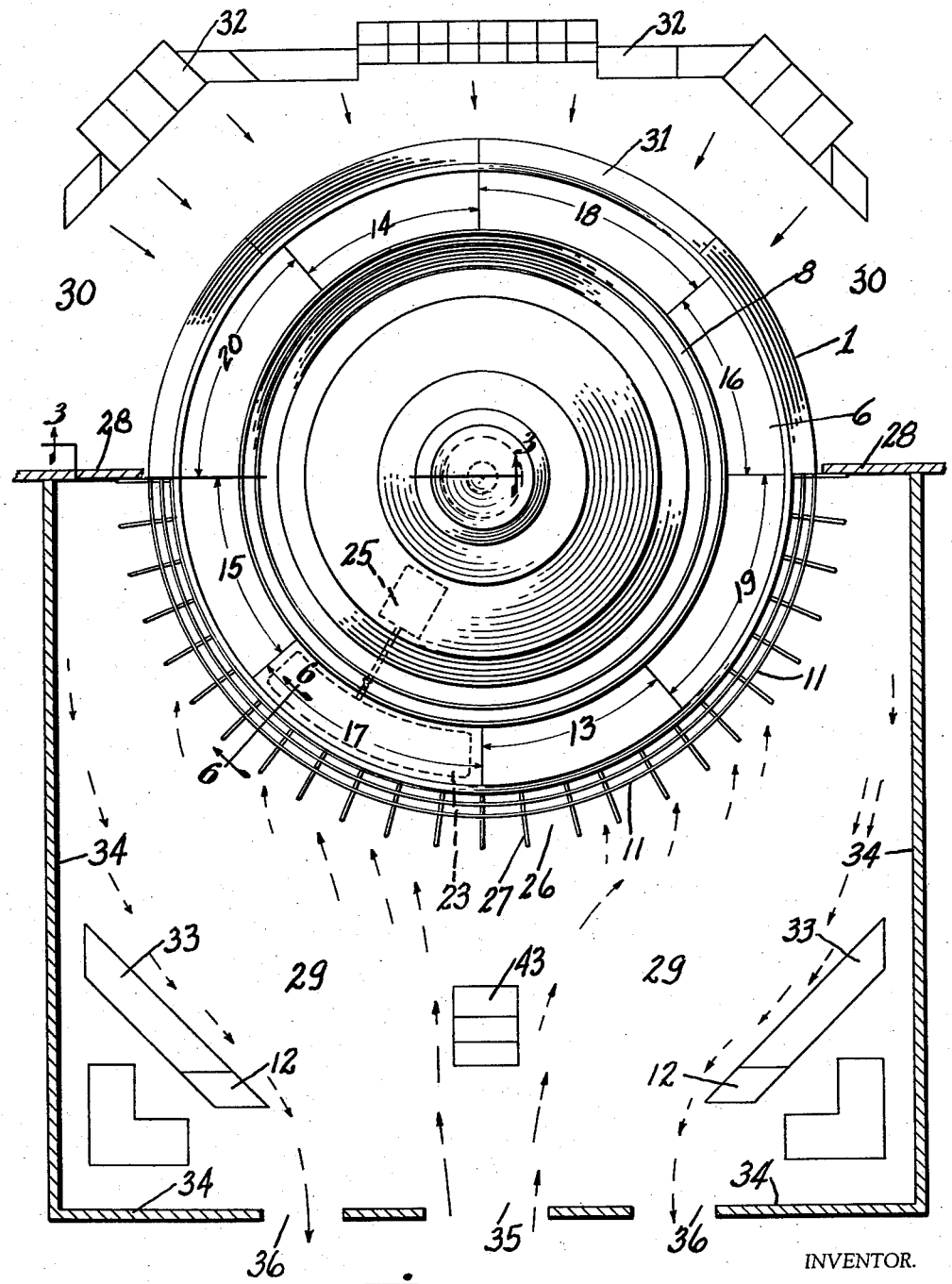
Figure 1 is a diagrammatic plan view of my method showing a rotatable and stationary serving counter together with essential appurtenances.
Figure 2:
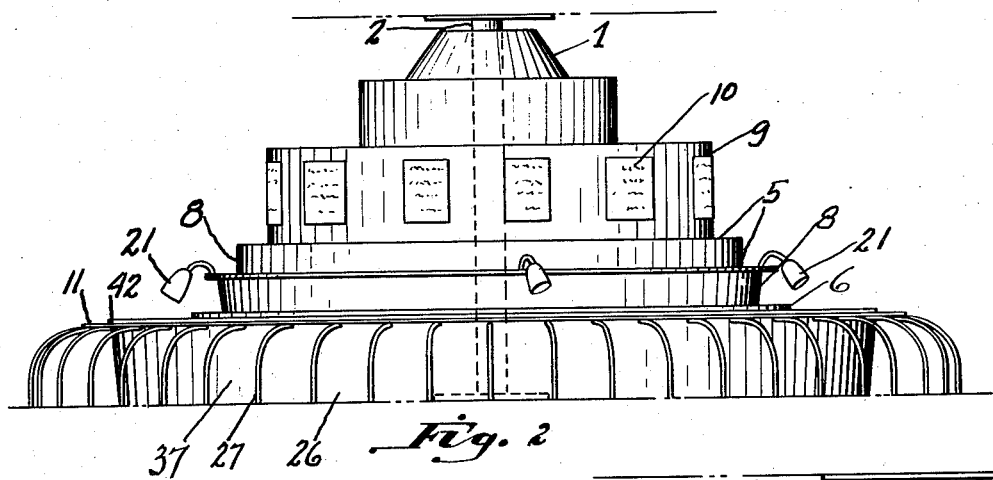
Figure 2 is the front in elevation of my rotatable and stationary serving counter.
Figure 3:
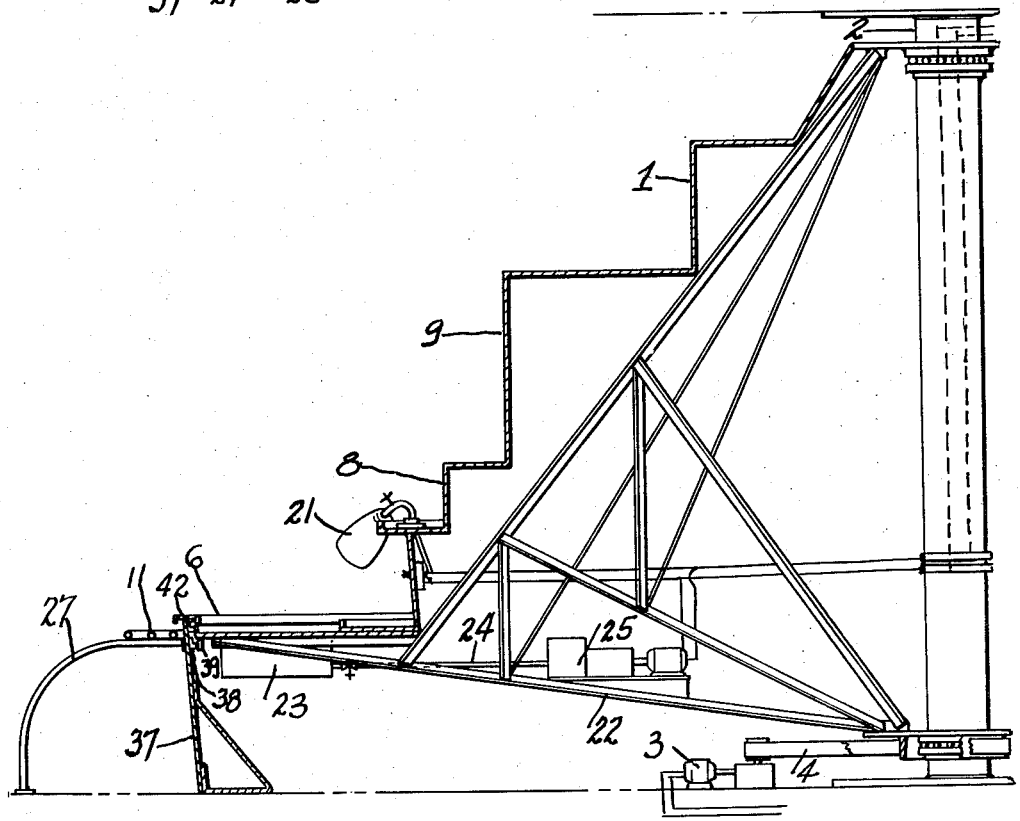
Figure 3 is a fragmentary section of my serving counter in elevation taken on line 3—3 of Figure 1.
Figure 4:
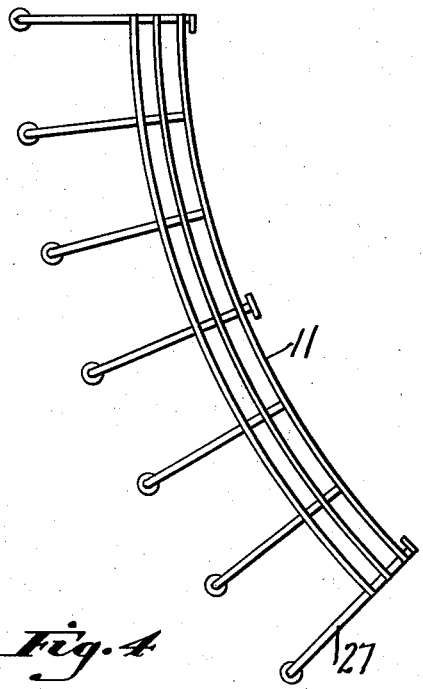
Figure 4 is a plan view of the stationary serving counters together with stalls.
Figure 6:
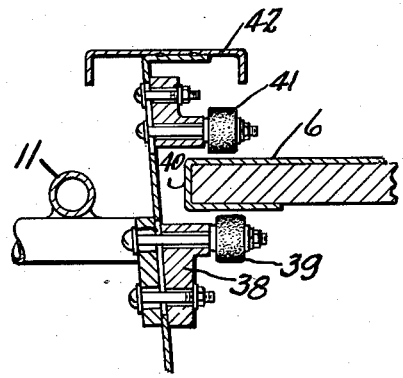
Figure 6 is a fragmentary enlargement of the counter and rollers taken on line 6—6 of Figure 1.
Figure 5:
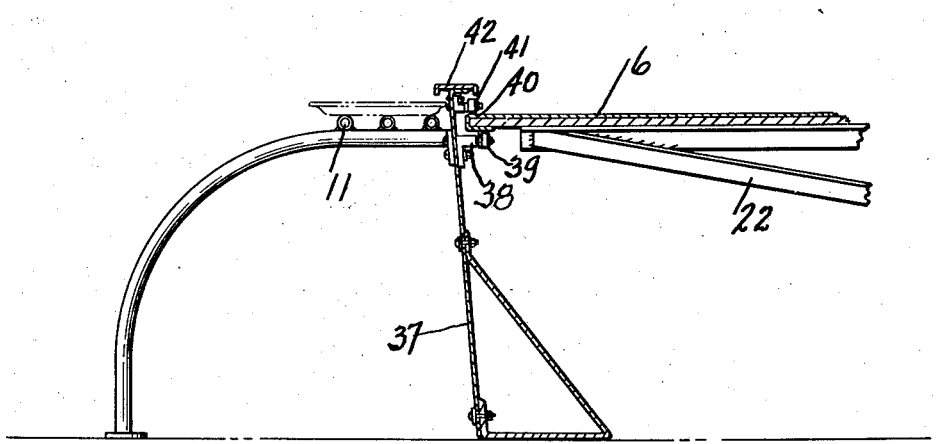
Figure 5 is an enlarged fragmentary section of the stalls, stationary and rotating counters.

Preferably the device accomplishing my method consists of a circular turret and rotatable serving counter 1 rotatably supported on a stationary column 2. The turret and rotatable counter is rotated by means of a standard electric motor and variable speed reduction gear unit 3 secured to the floor and connected to rotate the turret by means of a standard chain or belt 4. Standard electrical control and wiring means (not shown) will be utilized to supply the motor with the electric energy and to vary the speed of rotation of the turret and rotatable serving counter.

The turret and counter is arranged in circular tiers or steps 5 starting with a lower step 6 of such depth that will permit placing ready dished foods covered with individual transparent lids [not shown] within easy reach of a person desiring to take the food from the rotating counter. Other steps 8 successively smaller in diameter will be used for display and serving to customers. While I indicate a step like display, I do not wish to limit myself to this since a vertical cylindrical counter can be used. One of the steps 9 is taller than the others whereon menus 10 are displayed. The menu permits the customers to predetermine what food they desire and when it moves in front of them, they remove it from the rotating counter without too much deliberation and place it on a tray resting on a stationary counter 11 to be explained.

The lower step 6 is divided into sectors and the ready dished foods are placed thereon so that the same kind of food conforming to the menu will be positioned diametrically opposite of each other circumferentially around the rotating counter such as meat and vegetables in sectors 13 and 14, pastry 15 and 16, salads 17 and 18, and fruits 19 and 20. It is not intended to limit the method to these particular items of food since they are mentioned merely for illustrative purposes. Placing the same foods diametrically opposite permits replacements of ready dished foods on the counter while it passes through a kitchen area. This method permits the counter to rotate continuously, and covering each dish of food with a transparent covering eliminates the necessity of a sneeze guard.

Secured to the counter and rotatable therewith are electrical radiant heating elements 21 that will direct heat rays upon those foods that must be kept warm such as meats, soups and vegetables in sectors 13 and 14 or as many sectors carrying hot foods. Secured to and mounted on supports 22 rotatable with the turret and counter is an electrically operated refrigerator compressor unit 25 wired electrically with a power source [not shown]. This refrigerator unit is connected to cold plates 23 by means of pipes 24 and the cold plates will maintain the proper cold temperatures for foods that require refrigeration to preserve them during the interval of service. While I have only shown one such refrigerating unit, it is my intention to have several about my counter to alternate locations as the need requires.

Circumferentially around one-half of the rotating counter there is the stationary tray counter 11 divided into stalls 26 by means of pipe rails 27 betweeen which customers selecting food remain in a stationary position and select and remove the ready dished food from the rotating counter as it passes before them. Customers may select one or several items simultaneously without interference with each other. All of the food on display will pass before each customer during one-half revolution of the counter during which time most customers select and depart to the eating area. In the case of those who are slow to make decisions, the delay is limited to themselves and other customers around the serving counter will not be held back as occurs in the in-line counter method. After a customer has made selections and taken food according to my method the stall is vacated and another customer steps into the stall and repeats the method.

A barrier or wall 28 divides the service counter into a customer area 29 and a kitchen area 30. Surrounding the rotating counter there is a stationary work and loading table 31 where service attendants prepare and dish the foods and place them on the rotating counter while it continues to rotate and pass again into the customer area.

Adjacent to the work counter are bulk storage compartments 32 for various items of food such as meat, bread, vegetables, pastry, salads, etc. for dispensing into individual portions on plates preparatory to placing them on the rotating counter.

After leaving the rotating counter the customers proceed to a drink dispensing counter 33 where coffee, tea, milk or other liquids are ready for immediate pick-up.

The line of flow is shown by arrows on the customer area which is surrounded by walls or rails 34 to form an enclosure around the rotating counter. Entrances 35 admit the customers who proceed to a stationary position around the counter. After having served themselves with foods, the customers leave through exits 36 after passing before a checker counter 12 where the charge ticket for the food is made depending upon the system of a particular operation. There may be several entrances and exits depending upon the size of the unit so that there will be no line build up at the charging or paying station.

Peripherially around the rotating counter there is a stationary vertical apron 37 rigidly secured to the floor and the rails for the stalls. Secured near the top of the apron is a stationary ledge 38 upon which are rotatably supported rollers 39. Upon these rollers an outer rim 40 of the rotating counter is movably supported to stabilize and sustain the rotating counter in a horizontal position. Other rollers 41 are rotatably supported on the apron and hold the outer rim of the rotating counter down on the other rollers 39, thereby eliminating any raising or lowering of the counter during rotation. A cap 42 secured circumferentially about the stalls acts as a rest and shield to protect customers from injury or contacting the rollers while removing food from the counter.

In operation the customer enters the customer area, helps himself to trays and silverware from a station 43 and takes a stationary position in a stall. After studying the menu or the food on the counter the customer chooses and removes the selection from the counter while it passes in front of him and then places the dish or dishes of food on a tray. If only one item is desired the customer steps out of the stall and proceeds to take drinks, pass before the checker and then out of the area 29 to tables in an eating area. If several items are desired the customer remains at the counter only long enough to take these selections and then proceeds to the drink supply and checker and exit to the eating area. During the time selections and servings are accomplished each of the customers will be coming into a particular stall around the counter to select, serve themselves and leave without interfering or delaying other customers doing likewise at the same time in other stalls.

Having thus described my invention what is claimed as new and desired to be secured by Letters Patent is:

1. A cafeteria serving apparatus adapted to convey dished foods to a plurality of standing customers comprising, a series of circular counters mounted for rotation about a common perpendicular axis in horizontal planes one above the other and having successively reduced diameters, said counters being adapted to convey the dished foods, means on said counters dividing the same into a plurality of segments for segregating the dished foods, power means connected in common to said counters for rotating the same at a rate adapting the standing customers to remove the dished foods from said segments, a stationary circular support counter mounted in a horizontal plane common to said lowermost counter and concentric therewith, a partition dividing said stationary counter into a customer area and a kitchen area, said customer area being exposed to the plurality of standing customers for removal of the dished foods from the rotating counters to the stationary counter, a plurality of stall elements in said customer area, said stall elements disposed about the edge of the stationary counter along lines radiating from said perpendicular axis of rotation and spaced apart from one another whereby each stall element is adapted to admit at least one customer to the stationary counter, and said customer is inhibited from tangential movement with said rotating counter, and a plurality of radiant heating elements mounted upon one of said upper counters and adapted to direct heat rays downwardly into certain of the segments of said lower counters to heat the dished foods therein.

2. A cafeteria serving apparatus adapted to convey dished foods to a plurality of standing customers comprising, a series of circular counters mounted for rotation about a common perpendicular axis in horizontal planes one above the other and having successively reduced diameters, said counters being adapted to convey the dished foods, means on said counters dividing the same into a plurality of segments for segregating the dished foods, power means connected in common to said counters for rotating the same at a rate adapting the standing customers to remove the dished foods from said segments, a stationary circular support counter mounted in a horizontal plane common to said lowermost counter and concentric therewith, a partition dividing said stationary counter into a customer area and a kitchen area, said customer area being exposed to the plurality of standing customers for removal of the dished foods from the rotating counters to the stationary counter, a plurality of waist high bar stall elements in said customer area, said stall elements disposed about the edge of the stationary counter along lines radiating from said perpendicular axis of rotation and spaced apart from one another whereby each stall is adapted to admit at least one customer to the stationary counter and said customer is inhibited from moving along with said rotating counter, a refrigerator unit mounted within said rotatable counters and rotatable therewith, and a plurality of cold plates mounted in certain of said segments, said cold plates being connected with said refrigerator unit and adapted to chill the dished foods supported in said segments.

3. A cafeteria serving apparatus adapted to convey dished foods to a plurality of standing customers comprising, a series of circular counters mounted for rotation about a common perpendicular axis in horizontal planes one above the other, said counters being adapted to convey the dished foods, means on said counters dividing the same into a plurality of segments for segregating the dished foods, power means connected in common to said counters for rotating the same, a stationary circular support counter mounted in a horizontal plane common to said lowermost counter and concentric therewith, a partition dividing said stationary counter into a customer area and a kitchen area, said customer area being exposed to the plurality of standing customers for removal of the dished foods from the rotating counters to the stationary counter, a plurality of waist high stall elements in said customer area, said stall elements disposed about the edge of the stationary counter along lines radiating from said perpendicular axis of rotation and spaced apart from one another whereby each stall is adapted to admit customers in columnar arrangement to the stationary counter and said customers are inhibited from moving along with said rotating counter, a plurality of radiant heating elements mounted upon one of said upper counters and adapted to direct heat rays into certain of the segments of said lowermost counter to heat the dished food therein, a refrigerator unit mounted within said rotatable counters and rotatable therewith, and a plurality of cold plates mounted in certain of said segments, said cold plates being connected with said refrigerator unit and adapted to chill the dished foods supported in said segments.

References Cited in the file of this patent

UNITED STATES PATENTS

| | | |
|---|---|---|
| 565,180 | Rucquoy | Aug. 4, 1896 |
| 877,812 | Vogler | Jan. 28, 1908 |
| 1,143,279 | Johnson | June 15, 1915 |
| 1,330,890 | Mayne | Feb. 17, 1920 |
| 1,466,890 | Deloatch | Sept. 4, 1923 |
| 1,549,467 | Dumond et al. | Aug. 11, 1925 |
| 1,664,945 | Robert | Apr. 3, 1928 |
| 1,809,951 | Vilfordi | June 16, 1931 |
| 1,992,861 | Demos | Feb. 26, 1935 |
| 2,037,815 | Ora | Apr. 21, 1936 |
| 2,096,959 | Clerc | Oct. 26, 1937 |
| 2,227,581 | Henderson | Jan. 7, 1941 |
| 2,255,889 | Kleinwachter | Sept. 16, 1941 |
| 2,654,344 | Peterson et al. | Oct. 6, 1953 |
| 2,677,940 | Raskin | May 11, 1954 |